(12) United States Patent
Dziyauddin et al.

(10) Patent No.: US 9,913,170 B2
(45) Date of Patent: Mar. 6, 2018

(54) WIRELESS COMMUNICATION METHODS AND APPARATUS

(71) Applicant: KABUSHIKI KAISHA TOSHIBA, Tokyo (JP)

(72) Inventors: Rudzi Dziyauddin, Bristol (GB); Fengming Cao, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 14/773,181

(22) PCT Filed: Mar. 7, 2013

(86) PCT No.: PCT/GB2013/050563
§ 371 (c)(1),
(2) Date: Sep. 4, 2015

(87) PCT Pub. No.: WO2014/135822
PCT Pub. Date: Sep. 12, 2014

(65) Prior Publication Data
US 2016/0021575 A1 Jan. 21, 2016

(51) Int. Cl.
*G08C 17/00* (2006.01)
*H04W 28/16* (2009.01)
(Continued)

(52) U.S. Cl.
CPC .......... *H04W 28/16* (2013.01); *H04W 24/08* (2013.01); *H04W 52/267* (2013.01);
(Continued)

(58) Field of Classification Search
CPC ..... H04W 24/08; H04W 88/08; H04W 16/10; H04W 52/346
(Continued)

(56) References Cited

U.S. PATENT DOCUMENTS

| 2004/0053078 A1 | 3/2004 | Kikitsu et al. |
| 2007/0105583 A1 | 5/2007 | Gerlach |

(Continued)

FOREIGN PATENT DOCUMENTS

| CN | 101600212 A | 12/2009 |
| JP | 2004-39033 | 2/2004 |

(Continued)

OTHER PUBLICATIONS

International Preliminary Report on Patentability and Written Opinion issued by The International Bureau of WIPO dated Sep. 17, 2015, for International Application No. PCT/GB2013/050563.
(Continued)

*Primary Examiner* — Faisal Choudhury
(74) *Attorney, Agent, or Firm* — Finnegan, Henderson, Farabow, Garrett & Dunner, L.L.P.

(57) ABSTRACT

In an embodiment, a method of managing resources in a cell cluster of a wireless network is disclosed. The cell cluster comprises a plurality of cells, each cell having an inner region and an outer region. The method comprises: setting, for each cell, a power ratio, the power ratio being the ratio of the power level to be used for transmission of signals to wireless devices located in the inner region of that cell to the power level to be used for transmission of signals to wireless devices located in the outer region of that cell; allocating network resources from a plurality of network resources to wireless devices located in the outer regions; for each cell, allocating network resources to wireless devices located in the inner region of that cell from network resources of the plurality of network resources that are not allocated to wireless devices located in the outer region of that cell; receiving, for each cell, indications of a first data throughput rate for transmission of data to the wireless devices located in the outer regions; comparing, for each cell, the first data
(Continued)

throughput rate with a threshold data rate; and decreasing the power ratio for cells in which the first data throughput rate is less than the threshold data rate.

16 Claims, 12 Drawing Sheets

(51) Int. Cl.
| | | |
|---|---|---|
| *H04W 52/26* | (2009.01) | |
| *H04W 52/28* | (2009.01) | |
| *H04W 72/04* | (2009.01) | |
| *H04W 24/08* | (2009.01) | |
| *H04W 16/10* | (2009.01) | |
| *H04W 52/34* | (2009.01) | |
| *H04W 88/08* | (2009.01) | |

(52) U.S. Cl.
CPC ....... *H04W 52/283* (2013.01); *H04W 72/048* (2013.01); *H04W 72/0453* (2013.01); *H04W 16/10* (2013.01); *H04W 52/346* (2013.01); *H04W 88/08* (2013.01)

(58) Field of Classification Search
USPC .................................................. 370/331, 311
See application file for complete search history.

(56) References Cited

U.S. PATENT DOCUMENTS

| | | |
|---|---|---|
| 2010/0110996 A1 | 5/2010 | Tao et al. |
| 2010/0165510 A1 | 7/2010 | Takahashi et al. |
| 2011/0158187 A1 | 6/2011 | Komamura et al. |
| 2012/0244871 A1 | 9/2012 | Zhao |
| 2012/0307750 A1 | 12/2012 | Hunukumbure et al. |
| 2013/0023217 A1* | 1/2013 | Zhuang ................ H04W 24/02 455/63.1 |
| 2014/0051442 A1* | 2/2014 | Yang .................... H04W 36/12 455/436 |

FOREIGN PATENT DOCUMENTS

| | | |
|---|---|---|
| JP | 2007-129708 | 5/2007 |
| JP | 2008-287829 | 11/2008 |
| JP | 2012-253763 | 12/2012 |
| JP | 2013-516122 | 5/2013 |
| WO | WO 2008/095409 A1 | 8/2008 |

OTHER PUBLICATIONS

Huawei et al., "Some Clarifications on Soft Frequency Reuse Scheme," 3GPP TSG-RAN WG1 Meeting Ad Hoc LTE (Jan. 23-25, 2006), pp. 1-3.

English-language machine translation of JP 2012-124856 (Jun. 28, 2012).

Cao et al., "Joint Adaptive Soft Frequency Reuse and Virtual Cell Power Control in Relay Enhanced Cellular System," IEEE (Jan. 2009), pp. 1-5.

Qian et al., "Inter-cell Interference Coordination Through Adaptive Soft Frequency Reuse in LTE Networks," 2012 IEEE Wireless Communications and Networking Conference: MAC and Cross-Layer Design (2012), pp. 1628-33.

3GPP TSG RAN WG1#42, Further Analysis of Soft Frequency Reuse Scheme, Huawei (2005), pp. 1-6.

* cited by examiner

WIRELESS COMMUNICATION METHODS AND APPARATUS

FIELD

Embodiments described herein relate generally to wireless communication methods and apparatus.

BACKGROUND

Fractional Frequency Reuse (FFR) and Soft Frequency Reuse (SFR) are techniques used for inter-cell interference mitigation in networks such as Orthogonal Frequency-Division Multiple Access (OFDMA) networks. In both techniques the numbers of allocated channels or subcarriers or resource blocks for cell-edge (CEUs) and cell-centre users (CCUs) are independently predetermined for every adjacent cell. Each cell then assigns a different subset of channels to their cell-edge users. This is to ensure that the given channels will not overlap among adjacent cells. This principle is used to avoid inter-cell interference.

In FFR the channels allocated for cell edge users in a given cell are reserved, that is the channels are barred from use by neighbouring cells. This results in low spectrum efficiency as a trade-off to achieve better cell-edge performance since in any given cell some resources are prevented from being used.

In SFR, different subcarrier power levels are used for CCUs and CEUs. A low power is used to transmit signals to CCUs and a high power is used to transmit signals to CEUs. The reason for this is that it is the CEUs that mostly experience high interference, so a high subcarrier power is required to mitigate the interference. For CCUs a low subcarrier power is sufficient. SFR utilises all resources of the network in each cell. This results in high spectrum efficiency.

BRIEF DESCRIPTION OF THE DRAWINGS

In the following, embodiments will be described with reference to the accompanying drawings in which.

DETAILED DESCRIPTION

Figure 1:
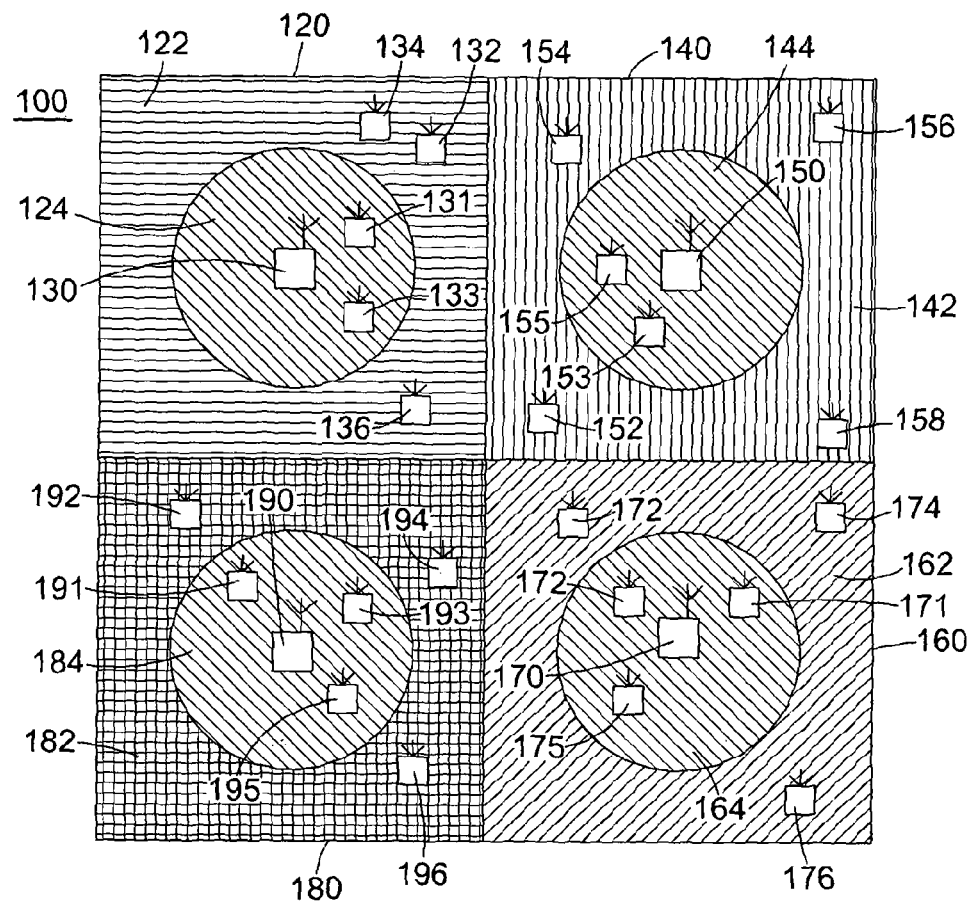
FIG. 1 shows a wireless network according to an embodiment.

In an embodiment, a method of managing resources in a cell cluster of a wireless network is disclosed. The cell cluster comprises a plurality of cells, each cell having an inner region and an outer region. The method comprises: setting, for each cell, a power ratio, the power ratio being the ratio of the power level to be used for transmission of signals to wireless devices located in the inner region of that cell to the power level to be used for transmission of signals to wireless devices located in the outer region of that cell; allocating network resources from a plurality of network resources to wireless devices located in the outer regions; for each cell, allocating network resources to wireless devices located in the inner region of that cell from network resources of the plurality of network resources that are not allocated to wireless devices located in the outer region of that cell; receiving, for each cell, indications of a first data throughput rate for transmission of data to the wireless devices located in the outer regions; comparing, for each cell, the first data throughput rate with a threshold data rate; and decreasing the power ratio for cells in which the first data throughput rate is less than the threshold data rate.

In an embodiment the method further comprises receiving, for each cell in which the first data throughput rate is less than the threshold data rate, indications of a second data throughput rate for transmission of data to the wireless devices located in the outer regions; comparing, for each cell in which the first data throughput rate is less than the threshold data rate, the second data throughput rate with the threshold data rate; determining for cells in which the second data throughput rate is below the threshold whether a resource exists that is not allocated to a wireless device located in an outer region of any neighbouring cell; and if a resource exists that is not allocated to a wireless device located in an outer region of any neighbouring cell, increasing the number of resources allocated to a wireless device located in the outer region.

In an embodiment allocating network resources from a plurality of network resources to wireless devices located in the outer regions comprises allocating network resources among the wireless devices located in the outer regions of the plurality of cells.

In an embodiment allocating network resources from a plurality of network resources to wireless devices located in the outer regions comprises comparing channel characteristics for wireless devices in different cells and making an allocation based on the result of the comparison.

In an embodiment allocating network resources from a plurality of network resources to wireless devices located in the outer regions comprises for each cell, allocating resources to wireless devices from a set of resources allocated to that cell.

In an embodiment the method further comprises calculating a measure of the difference between the first data throughput rate and the threshold data rate, and decreasing the power ratio by an amount depending on the measure of the difference.

In an embodiment the number of network resources from the plurality of network resources allocated to wireless devices located in the outer region of a cell is determined from the number of wireless devices located in the outer region of that cell.

In an embodiment a method of managing resources in a cell of a wireless network is disclosed. The cell has an inner region and an outer region. The method comprises: setting an initial power ratio for the ratio of the power used to transmit signals from the base station to wireless devices located in the inner region to the power used to transmit signals from a base station within the cell to wireless devices located in the outer region; allocating network resources to wireless devices located in the outer region; allocating network resources to wireless devices located in the inner region; transmitting data to the wireless; measuring a first data throughput rate for transmission of data to the wireless devices located in the outer region; comparing the first data throughput rate with a threshold data rate; if the first data throughput rate is less than the threshold data rate, decreasing the power level ratio; and transmitting data to the wireless devices at the decreased power level ratio.

In an embodiment the method further comprises determining a second data throughput rate; comparing the second data throughput rate with the threshold data rate; determining whether a resource exists that is not allocated to a wireless device located in an outer region of any neighbouring cell; and if a resource exists that is not allocated to a wireless device located in an outer region of any neighbouring cell, increasing the number of resources allocated to a wireless device located in the outer region.

In an embodiment the method further comprises calculating a measure of the difference between the first data throughput rate and the threshold data rate, and decreasing the power ratio by an amount depending on the measure of the difference.

In an embodiment the number of network resources from the plurality of network resources allocated to wireless devices located in the outer region of the cell is determined from the number of wireless devices located in the outer region of that cell.

In an embodiment a network controller comprises: a communications module operable to send and receive signals from a plurality of base stations of a wireless network, the wireless network comprising a plurality of cells, each cell having an inner region and an outer region, base stations of the plurality of base stations being located in the inner regions of the cells; and a processor operable to set, for each cell, a power ratio, the power ratio being the ratio of the power level to be used for transmission of signals to wireless devices located in the inner region of that cell to the power level to be used for transmission of signals to wireless devices located in the outer region of that cell; allocate network resources from a plurality of network resources to wireless devices located in the outer regions; for each cell, allocate network resources to wireless devices located in the inner region of that cell from network resources of the plurality of network resources that are not allocated to wireless devices located in the outer region of that cell; compare, for each cell, a first data throughput rate for transmission of data to the wireless devices located in the outer regions with a threshold data rate; and decrease the power ratio for cells in which the first data throughput rate is less than the threshold data rate.

In an embodiment the processor is further operable to: compare, for each cell in which the first data throughput rate is less than the threshold data rate, a second data throughput rate for transmission of data to the wireless devices located in the outer regions with the threshold data rate; determine for cells in which the second data throughput rate is below the threshold whether a resource exists that is not allocated to a wireless device located in an outer region of any neighbouring cell; and if a resource exists that is not allocated to a wireless device located in an outer region of any neighbouring cell, increase the number of resources allocated to a wireless device located in the outer region.

In an embodiment the processor is operable to compare channel characteristics for wireless devices in different cells and make an allocation of wireless network resources based on the result of the comparison.

In an embodiment the processor is operable to calculate a measure of the difference between the first data throughput rate and the threshold data rate, and decrease the power ratio by an amount depending on the measure of the difference.

In an embodiment a base station comprises: an antenna operable to transmit and receive signals from wireless devices in a cell of a wireless network, the cell having an inner region and an outer region; and a processor operable to set an initial power ratio for the ratio of the power used to transmit signals from the base station to wireless devices located in the inner region to the power used to transmit signals from a base station within the cell to wireless devices located in the outer region; allocate network resources to wireless devices located in the outer region; allocate network resources to wireless devices located in the inner region; determine a first data throughput rate for transmission of data to the wireless devices located in the outer region; compare the first data throughput rate with a threshold data rate; and if the first data throughput rate is less than the threshold data rate, decrease the power level ratio.

In an embodiment the processor is further operable to determine a second data throughput rate; compare the second data throughput rate with the threshold data rate; determine whether a resource exists that is not allocated to a wireless device located in an outer region of any neighbouring cell; and if a resource exists that is not allocated to a wireless device located in an outer region of any neighbouring cell, increase the number of resources allocated to a wireless device located in the outer region.

In an embodiment the processor is further operable to calculate a measure of the difference between the first data throughput rate and the threshold data rate, and decrease the power ratio by an amount depending on the measure of the difference. Embodiments provide computer program products comprising computer executable instructions which, when executed by a computer, cause the computer to perform a method as set out above. The computer program products may be embodied in a carrier medium, which may be a storage medium or a signal medium. A storage medium may include optical storage means, or magnetic storage means, or electronic storage means.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1 shows a wireless network 100 according to an embodiment. The wireless network 100 comprises a cluster of cells. As shown in FIG. 1 the cluster of cells comprises a first cell 120, a second cell 140, a third cell 160, and a fourth cell 180.

Each cell is divided into an inner region and an outer region and the division is based on either distance to the base station or the received signal strength. For example, based on one of the following rules: 1) At any point in the outer region, the distance to the serving Base station is larger than a threshold. 2) At any point in the outer region, the received power from the base station of the serving cell minus the strongest interference from the neighbouring base stations is less than a given threshold. 3) At any point in the outer region, the Signal to Interference plus Noise Ratio (SINR) at this point without strongest interference from neighbouring base station is larger than a threshold, while the SINR with strongest interference is less than a threshold.

The first cell is divided into an inner region 124 and an outer region 122. A base station 130 is located in the inner region 124 of the first cell 120. Five remote units 131-136 are located in the first cell 120. Two of the remote units 131 133 are located in the inner region 124 of the first cell. Three of the remote units 132 134 136 are located in the outer region 122 of the first cell 120. In the following, remote units located in the inner region of a cell are referred to as Cell Centre Users (CCUs) and remote units located in the outer region of a cell are referred to as Cell Edge Users (CEUs).

The second cell 140 is divided into an inner region 144 and an outer region 142. A base station 150 is located in the inner region 144 of the second cell 140. Two remote users 151 153 or CCUs are located in the inner region 144 of the second cell 140. Four remote units 152 154 156 158 or CEUs are located in the outer region 142 of the second cell 140.

The third cell 160 is divided into an inner region 164 and an outer region 162. A base station 170 is located in the inner region 164 of the third cell 160. Three remote stations 171 173 175 or CCUs are located in the inner region 164 of the third cell 160. Three remote units 172 174 176 or CEUs are located in the outer region 162 of the third cell 160.

The fourth cell 180 is divided into an inner region 184 and an outer region 182. A base station 190 is located in the inner region 184 of the fourth cell 180. Three remote stations 191 193 195 or CCUs are located in the inner region 184 of the fourth cell 180. Three remote stations 192 194 196 or CEUs are located in the outer region 182 of the fourth cell 180.

Figure 2:
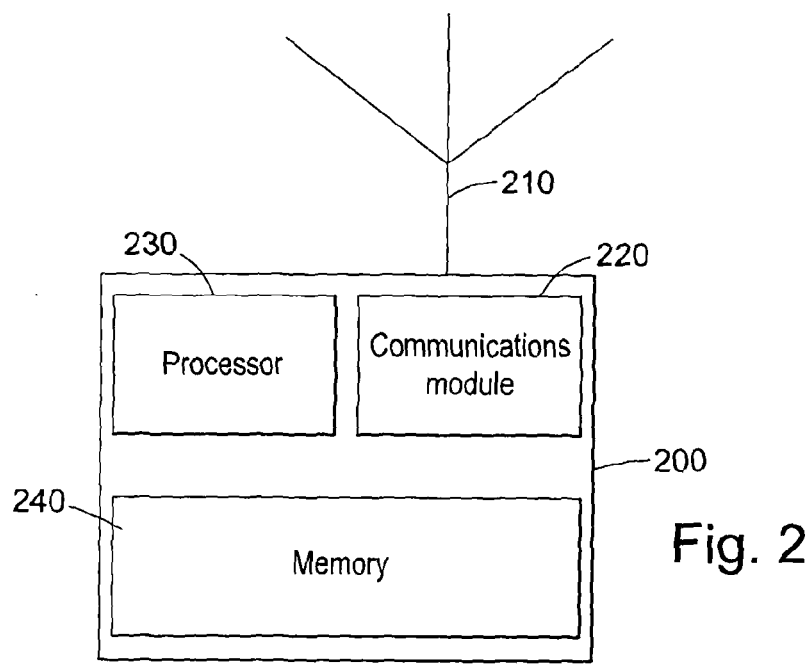
FIG. 2 shows a base station according to an embodiment.

FIG. 2 shows an embodiment of a base station 200. The base station 200 corresponds to one of the base stations shown in FIG. 1. The base station 200 comprises an antenna 210, a communications module 220, a processor 230 and a memory 240.

The communications module 220 is operable to cause the antenna 210 to transmit and receive signals from remote units. The processor 230 is coupled to the memory 240. The processor 230 controls the communications module 220 and is operable to execute a computer program stored in the memory 240 to manage transmission of data to remote units.

Figure 3:
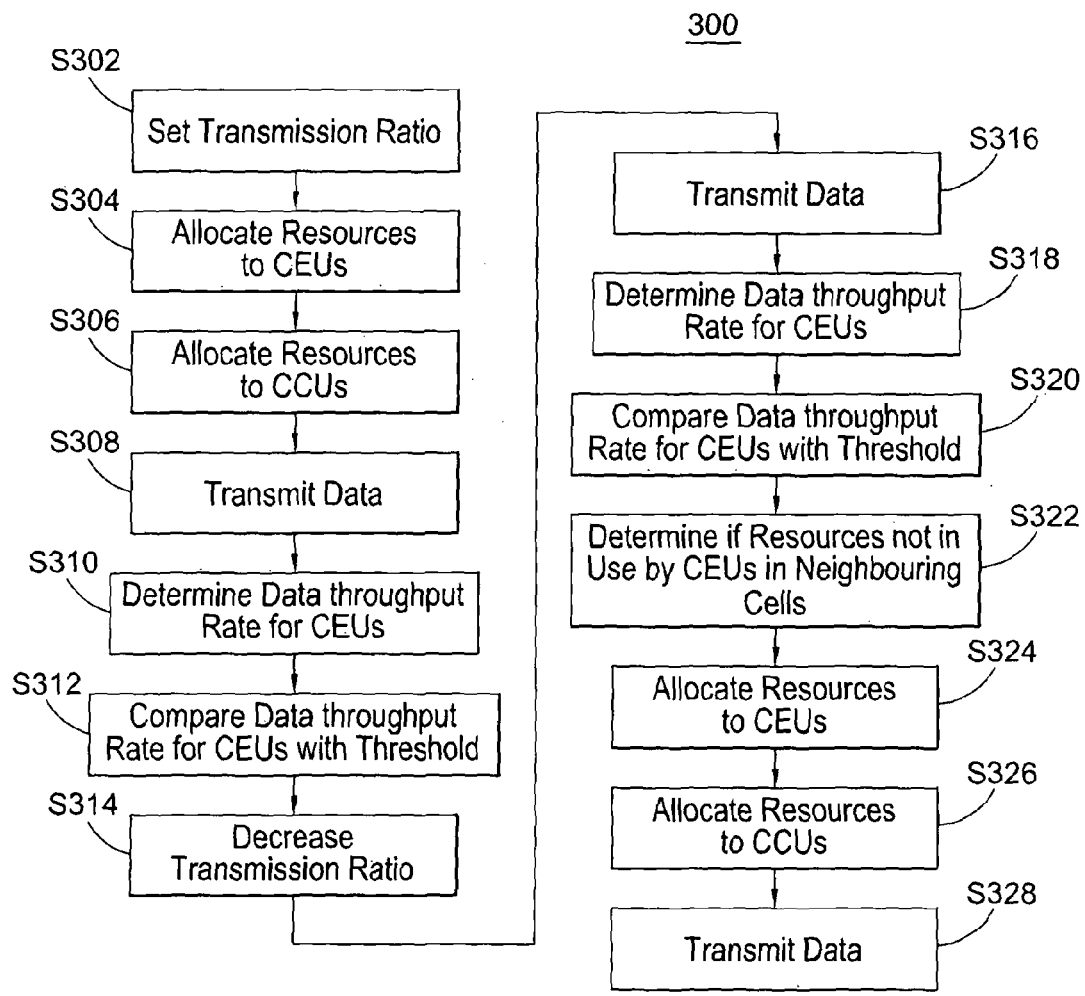
FIG. 3 shows a method of managing network resources according to an embodiment.

FIG. 3 is a flow chart showing a method 300 of managing network resources. The method 300 may be implemented as a computer program which is executed by the processor of a base station as shown in FIG. 2. The network resources are subcarriers or channels used to transmit signals between the base station and remote units.

In step S302 a transmission power ratio is set. The transmission power ratio is the ratio of the power level of subcarriers used to transmit signals to CCUs to the power level of subcarriers used to power level of subcarriers used to transmit signals to CEUs. The transmission power ratio will typically be in the range 0.1 to 0.4.

A greater power level is used to transmit signals to CEUs because they generally experience greater interference and are further from the base station that the CCUs. Since a lower power level is used for CCUs, subcarriers used for CCUs in one cell can be reused to transmit signals to CEUs or CCUs in neighbouring cells. Because the signal power level used for CEUs is higher, a subcarrier used for CEUs in one cell cannot be used for CEUs in a neighbouring cell since interference would result.

In step S304 subcarriers are allocated to CEUs in the cell. In the method shown in FIG. 3 it is assumed that a set of subcarriers are pre-allocated to CEUs for the cell. In step S306, subcarriers are allocated to CCUs in the cell. In step S306 any subcarriers that were not allocated in step S304 to CEUs may be allocated to the CCUs in the cell.

In step S308 data is transmitted to the remote units in the cell using the subcarriers allocated in steps S304 and S306. The transmission powers for the transmissions are determined using the ratio set in step S302.

In step S310 a data throughput rate for the transmissions to the CEUs is determined.

In step S312 the data throughput rate is compared with a threshold. The threshold represents a required data rate or Quality of Service (QoS). The threshold may be the same for neighbouring cells of a network or may vary between cells of the network.

If the data throughput rate is greater than the threshold the method restarts for the next frame of data to be transmitted. If the data throughput rate is less than the threshold, the method moves to step S314 in which the transmission ratio is decreased.

The effect of decreasing the power level ratio in step S314 is to increase the power used to transmit signals to CEUs is increased.

In step S316 data is transmitted to the remote units in the cell using the subcarriers allocated in steps S304 and S306. The transmission powers for the transmissions are determined using the adjusted ratio set in step S314.

In step S318 the data throughput rate for the transmissions to the CEUs is determined.

In step S320 the data throughput rate is again compared with the threshold. If the data throughput rate is greater than the threshold the method restarts for the next frame of data to be transmitted. If the data throughput rate is less than the threshold, the method moves to step S322

In step S322 it is determined whether there exist subcarriers that are not in use by CEUs in neighbouring cells. If any subcarriers exist that are not in use by CEUs in neighbouring cells the method moves to step S324.

In step S324 subcarriers are allocated to CEUs. The resources allocated to CEUs include the subcarriers identified in step S322.

In step S326 subcarriers are allocated to CCUs. As in step S306, any subcarriers that were not allocated in step S324 to CEUs may be allocated to the CCUs in the cell.

In step S328 data is transmitted to the remote units in the cell using the subcarriers allocated in steps S324 and S326.

Figure 4:
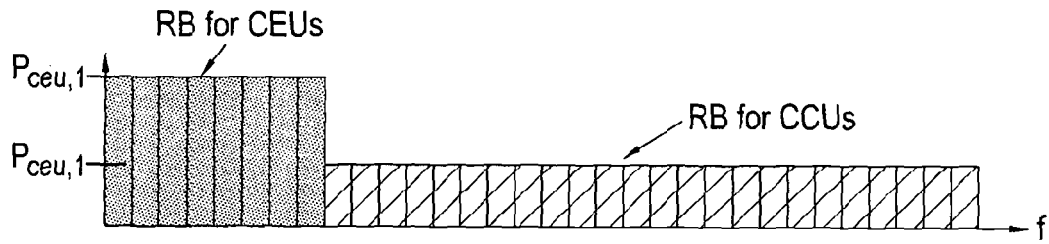
FIG. 4 shows an allocation of network resources in an embodiment.
Figure 4:
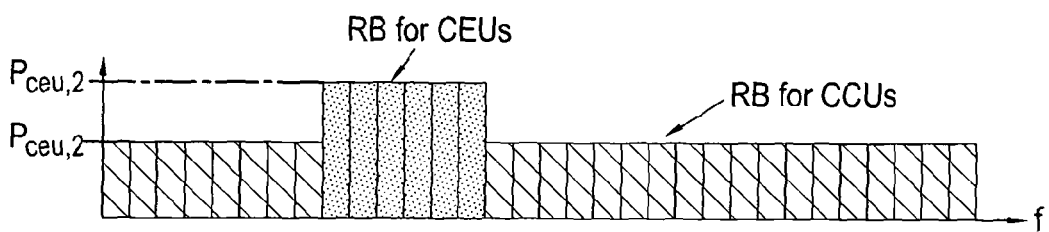
Figure 4:
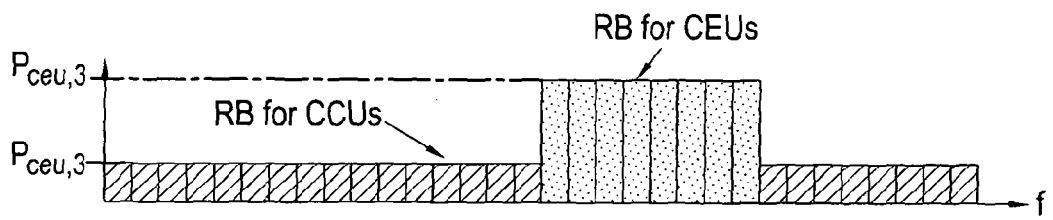
Figure 4:
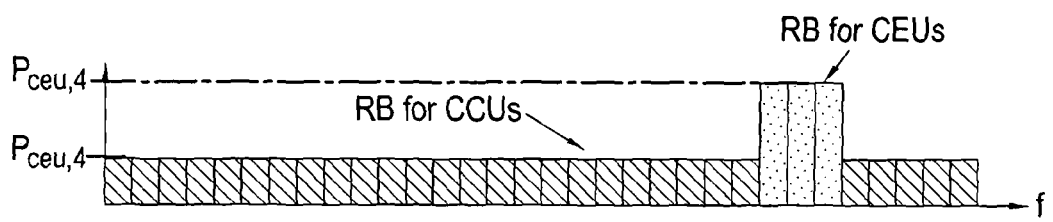

FIG. 4 shows the allocation of network resources in 4 cells. In cell 1, a number of subcarriers or Resource Blocks (RBs) are allocated to CEUs. The remaining RBs are allocated to CCUs. The RBs allocated to CEUs in cell 1 are transmitted at power $P_{ceu,1}$ and the RBs allocated to CCUs in cell 1 are transmitted at a lower power $P_{ccu,1}$. For cell 2, a set of RBs are allocated to CEUs which do not overlap with the RBs allocated to CEUs in cell 1. The remaining RBs are allocated to CCUs. The RBs allocated to CEUs in cell 2 are transmitted at power $P_{ceu,2}$ and the RBs allocated to CCUs in cell 2 are transmitted at a lower power $P_{ccu,2}$. Similarly for cell 3 and cell 4, RBs are allocated to CEUs which do not overlap with the RBs allocated to CEUs in other neighbouring cells.

As illustrated in FIG. 4, the number of RBs allocated to CEUs may vary between cells. The transmission powers used to transmit to CEUs and CCUs may also vary between cells.

Embodiments provide an adaptive soft frequency reuse scheme which is adaptive to cell environments. For example the number of CEUs in a cell may be taken into account when determining the number of resource bands allocated to CEUs. Further, when setting the power level ratio, quality of service requirements for cell edge users, such as data rates are taken into account. Embodiments therefore provide schemes in which cell edge throughput is improved in addition to overall performance by mitigating inter-cell interference.

Figure 5:
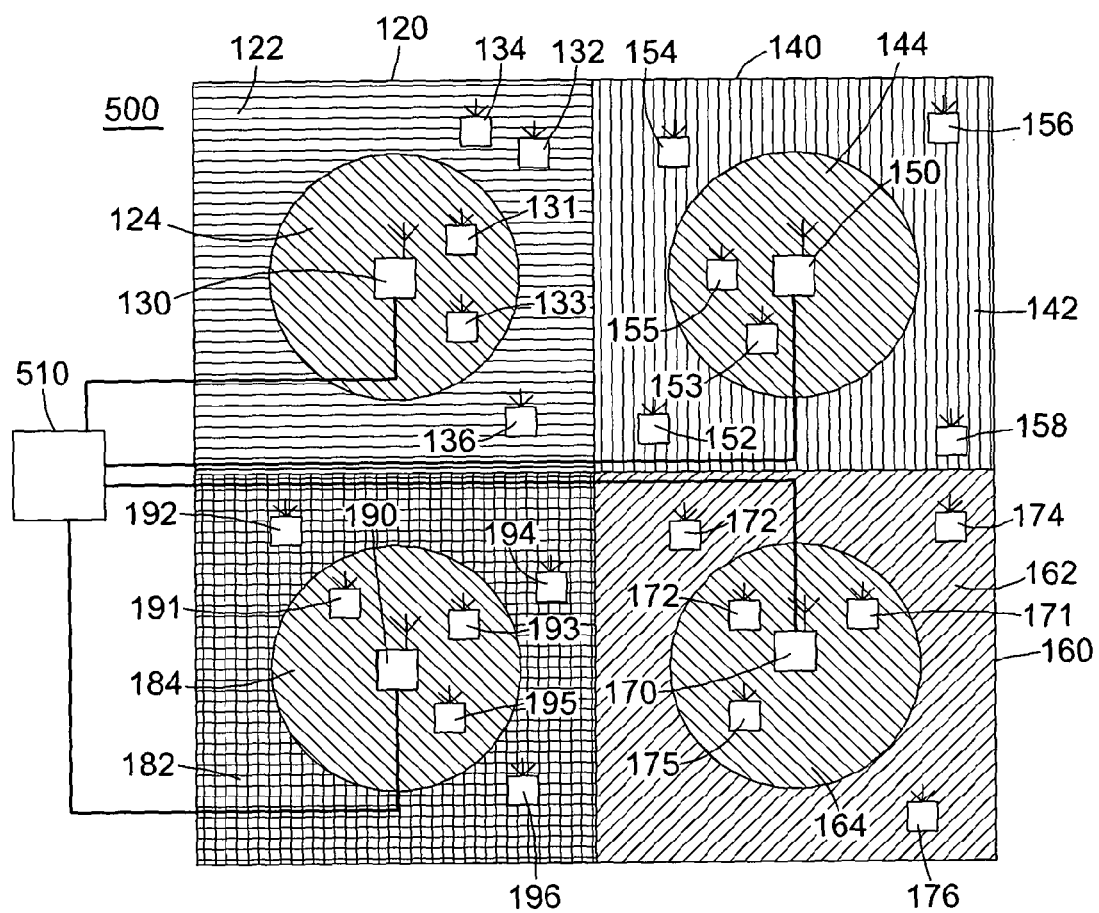
FIG. 5 shows a wireless network according to an embodiment.

FIG. 5 shows a wireless network 500 according to an embodiment. The wireless network 500 comprises a cluster of cells. The cells of the network are as described in relation to FIG. 1 above. Like reference numbers repeated from FIG. 1 indicate like features of the network shown in FIG. 5.

As shown in FIG. 5 a cell cluster controller 510 is coupled to the base stations 130 150 170 190. The cell cluster controller controls the allocation of resources in the four cells.

Figure 6:
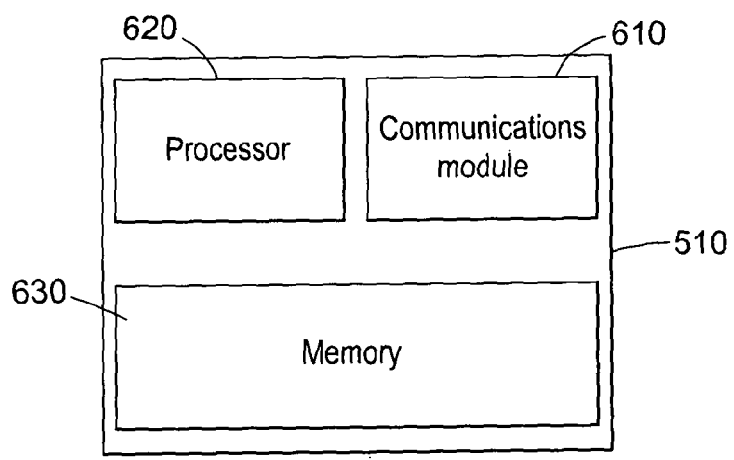
FIG. 6 shows a cell cluster controller according to an embodiment.

FIG. 6 shows a cell cluster controller 510 of an embodiment. The cell cluster controller comprises a communications module 610. The communications module is operable to communicate with base stations. The communication with base stations may be via wired or wireless communication. The cell cluster controller also comprises a processor 620 and a memory 630. In use the processor 620 executes a program stored in the memory to manage network resources in the network 500.

Figure 7:
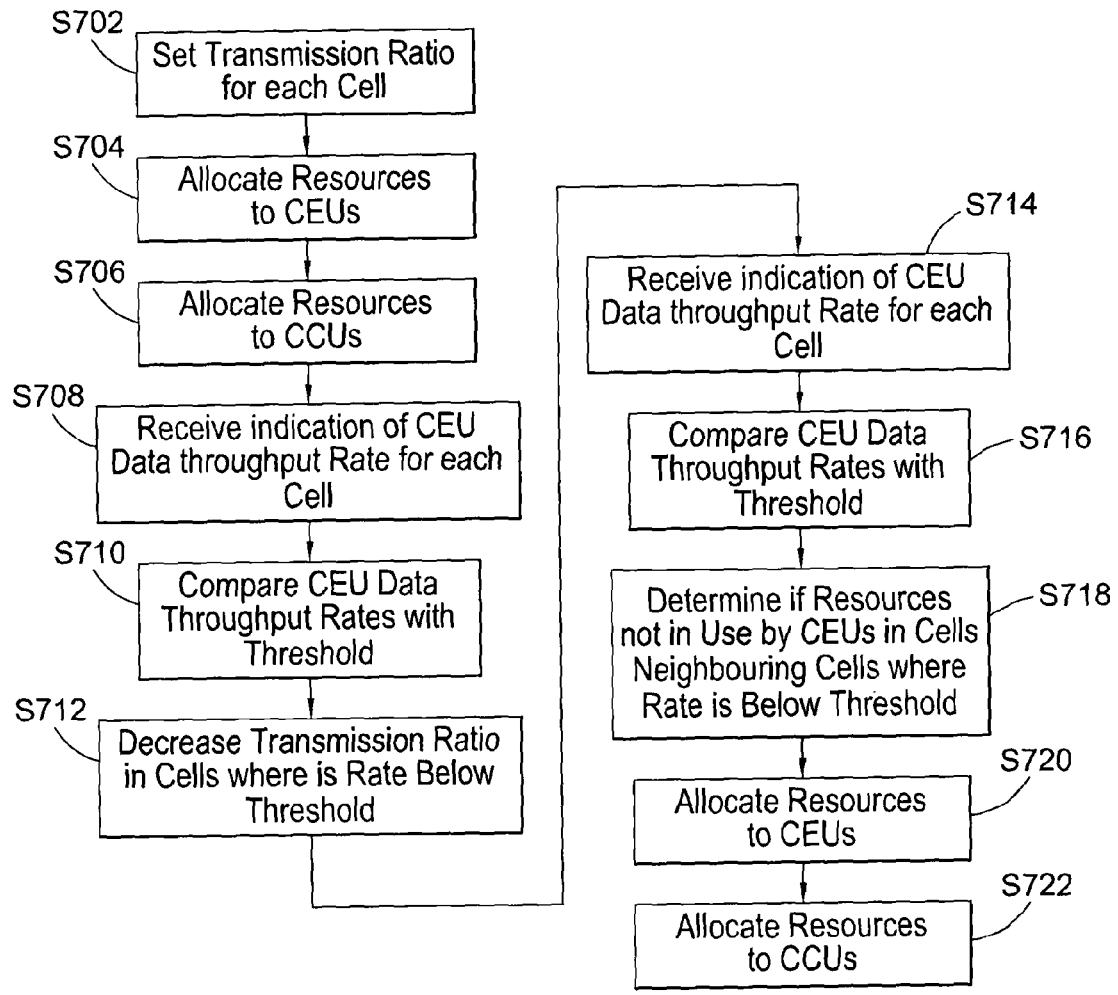
FIG. 7 shows a method of managing network resources according to an embodiment.

FIG. 7 shows a method of managing network resources according to an embodiment. The method shown in FIG. 7 may be carried out by the cell cluster controller 510 shown in FIGS. 5 and 6.

In step S702 a transmission ratio is set for each cell. The transmission ratio determines the ratio of the power used to transmit to cell centre users (CCUs) to the power used to transmit to cell edge users (CEUs).

In step S704 resources are allocated to CEUs. As the method shown in FIG. 7 takes place in the cell cluster controller which controls a plurality of cells, the allocation of resources (subcarriers or channels) takes place in a centralised manner. Resources may be allocated to CEUs according to the channel conditions such as signal to noise ratio experienced by CEUs.

In step S706 resources are allocated to CCUs. In step S706 any subcarriers that were not allocated in step S704 to CEUs within a cell may be allocated to the CCUs in that cell.

Following step S706, the base stations use the allocated resources to transmit signals to the CEUs and the CCUs.

In step S708 indications are received from the base stations. Each base station sends the cell cluster controller an indication of the data throughput rate for CEUs in the cell that the base station is located in.

In step S710 the CEU data throughput rates in the cells are compared with a threshold data throughput rate.

In step S712, in cells where the CEU data throughput rate is below the threshold, the transmission ratio is reduced.

Following step S712, the base stations transmit data to the remote stations using the adjusted transmission ratio in cells in which the ratio was reduced and using the original transmission ratio in cells in which the CEU data rate was above the threshold.

In step S714 indications are received from the base stations. Each base station sends the cell cluster controller an indication of the data throughput rate for CEUs in the cell that the base station is located in.

In step S716 the data throughput rates are compared with a threshold rate.

In step S718, for cells in which the data throughput rate is determined to be below the threshold in step S716, it is determined whether there exist subcarriers that are not in use by CEUs in neighbouring cells.

In step S720 resources are allocated to CEUs. The resources that are allocated to CEUs in S720 may include the resources identified in step S718.

In step S722 resources are allocated to CCUs. The resources are that not allocated to CEUs in a cell are allocated to CEUs.

Following S722, the base stations use the allocated resources to transmit signals to the remote units.

Figure 8:
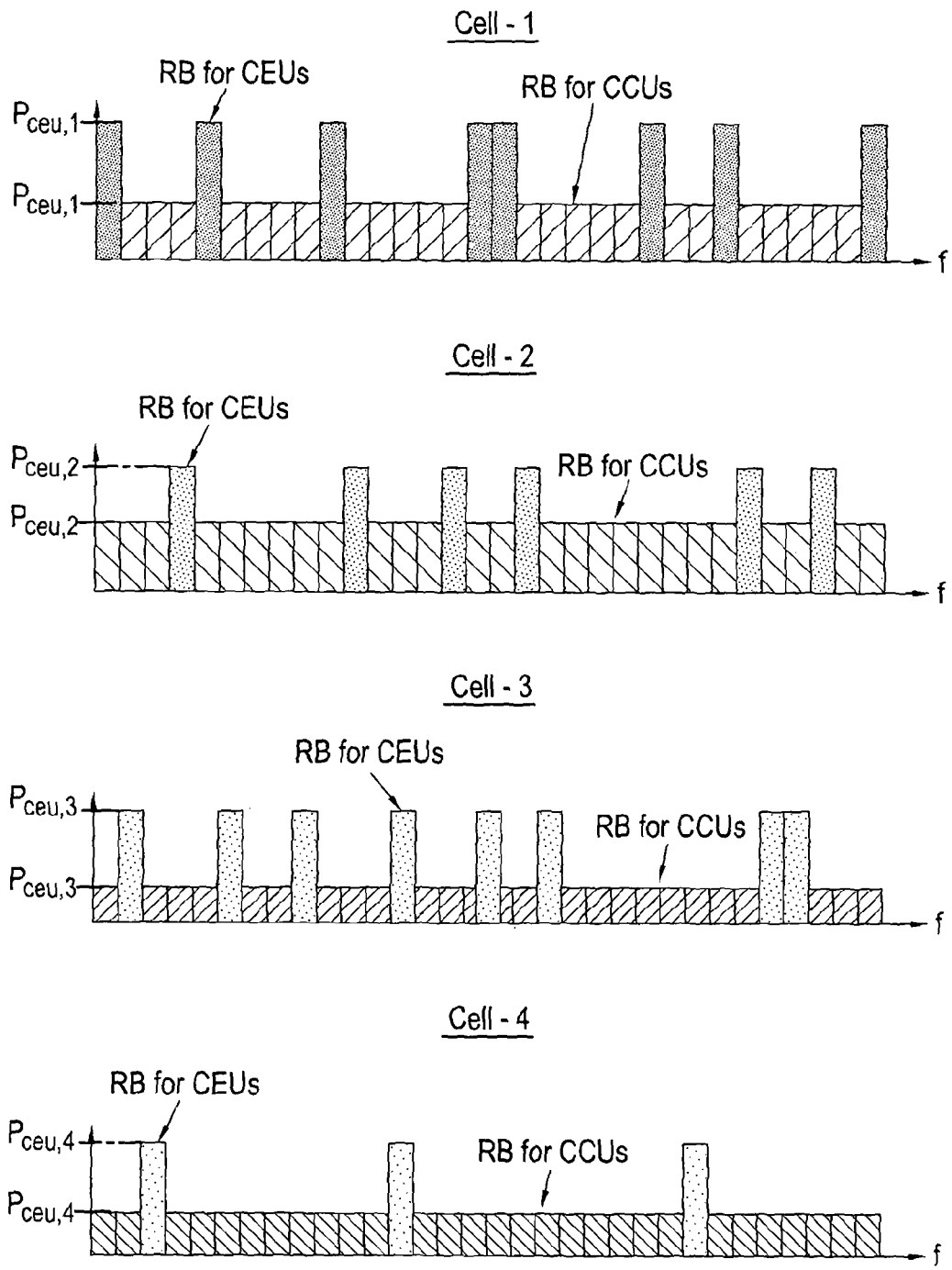
FIG. 8 shows an allocation of network resources in an embodiment.

FIG. 8 shows resource blocks allocated to cell edge users and cell centre users in an embodiment. As shown in FIG. 8, the resources are not allocated in consecutive blocks. Resource blocks may be allocated to CEUs in cells depending on the channel conditions experienced by the CEUs.

As shown in FIG. 8, the power levels may vary for different cells. Further, the number of resource blocks allocated to CEUs may vary from cell to cell. The number of resource blocks allocated to CEUs in a given cell may be initially set by the number of CEUs in that cell. As shown in FIG. 8 in a cell resource blocks that are not allocated to CEUs are allocated to CCUs. The resource blocks allocated to CCUs are transmitted with a lower power that the resource blocks allocated to CEUs.

Embodiments of adaptive SFR methods will now be explained with reference to FIGS. 9 to 12.

Figure 9:
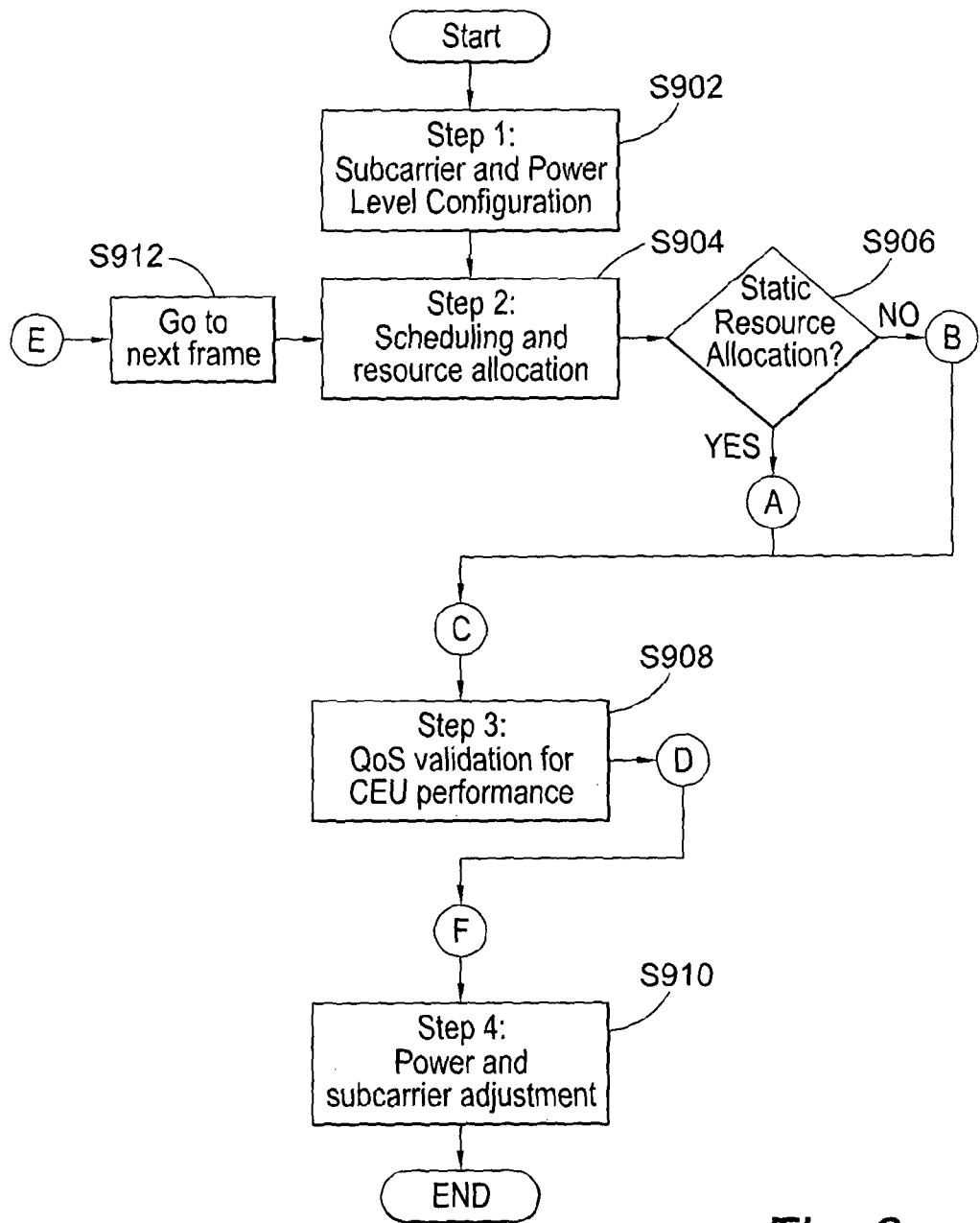
FIGS. 9 to 12 show methods of managing network resources according to embodiments.

FIG. 9 shows an overview of embodiments of methods of managing network resources. In S902 subcarriers numbers power levels are configured. This process is described under the heading 'Step 1: Subcarrier and Power level configuration' below. Following Step 1, the method moves to Step 2 (S904): Scheduling and resource allocation. Resources can either be allocated for CEUs in each cell before the method starts—this is static resource allocation, or resources can be allocated to CEUs across the cells during the method—this is dynamic resource allocation.

Static resource allocation may be implemented on a base station, or on a cell cluster controller. If static resource allocation is implemented on a cell cluster controller, the number of CEUs and the total number of users will be transmitted to the cell cluster controller from base stations. For dynamic resource allocation, the number of CEUs and the total number of users will be transmitted to the cell cluster controller from base stations. For dynamic resource allocation, channel characteristics are also transmitted to the cell cluster controller, then the cell cluster controller determines the resources for CEUs in each cell.

In S906, if the resource allocation is static, the method passes from point A to point C. The steps between points A and C are described in more detail with reference to FIG. 10. If the resource allocation is dynamic, the method passes from point B to point C. The steps between points B and C are described in more detail with reference to FIG. 11. In Step 3 (S908) the data throughput rate for CEUs is compared with a quality of service (QoS) requirement. Depending on whether the QoS is met, the method either passes to Step 4 is Power level optimisation or goes to the next frame in S912. If the data throughput rate for CEUs is below the QoS requirement, the method moves through point D to F to Step 4 (5910) which is described in more detail below with reference to FIG. 12. If the QoS requirement is met, the method moves from D to E and moves onto the next frame in S912.

Steps 1 to 4 will now be described in more detail.

Step 1: Subcarrier and Power Level Configuration

Given that the number of subcarriers and their power can have a relationship with the transmit powers $P_{Tx}$ in OFDMA cell-n as:

$$\sum_{i=1}^{N_{ceu,n}} p_{ceu,n,i} + \sum_{j=1}^{N_{ccu,n}} p_{ccu,n,j} \leq P_{Tx} \quad (1)$$

subject to:

$$N_{ceu,n} + N_{ccu,n} \leq N, N_{ceu,n} \leq N_{ccu,n} \quad (2)$$

$$P_{ceu,n,i} > P_{ccu,n,j} \quad (3)$$

where $N_{ceu,n}$ and $N_{ccu,n}$ represent the number of subcarriers assigned to CEUs and CCUs respectively, whilst $p_{ceu,n,i}$ and $p_{ccu,n,j}$ are the power of the subcarrier i and subcarrier j assigned to CEU and CCU respectively.

Let $N_{ceu,n} + N_{ccu,n} \to N$ the subcarrier ratio $\beta_n$ indicates the weight of allocated CEU subcarriers over the available subcarriers N. The weight can be computed as If $N_{ceu,n}$ is predetermined:

$$\beta_n = \frac{N_{ceu,n}}{N} \quad (4)$$

Or, else can be adaptive in terms of the number of CEUs $U_{ceu,n}$ and total users $U_{T,n}$ as:

$$\beta_n = \frac{U_{ceu,n}}{U_{T,n}} \quad (5)$$

Thus, the number of subcarriers of CEU and CCU can be written respectively in the form of $\beta_n$ and N as:

$$N_{ceu,n} = \lfloor \beta_n N \rfloor \quad (6)$$

$$N_{ccu,n} = \lfloor (1-\beta_n) N \rfloor \quad (7)$$

Let all the subcarriers across all CEUs in a cell be set with the same power. This is also applied to CCUs but the power level is lower as shown in (3). Thus, the subcarrier power of CCUs, $P_{CCU}$ can be represented in terms of the subcarrier power of CEUs, $P_{CEU}$ in cell-n as:

$$P_{CCU,n} = \alpha_n P_{CEU,n} \quad (8)$$

Where $\alpha_n$ is the transmission power ratio.

Assume that $\sum_{i=1}^{N_{ceu}} p_{ceu,n,i} + \sum_{j=1}^{N_{ccu}} p_{ccu,n,j} \to P_{Tx}$ to maximise the CEUs and the overall performance, thus equation (1) can be written in different notations based on from (4) to (8) as:

$$P_{CEU,n} \times N_{ceu,n} + P_{CCU,n} \times N_{ccu,n} = P_{Tx} \quad (9)$$

$$P_{CEU,n}(\beta_n N) + \alpha_n P_{CEU,n}(1-\beta_n) N = P_{Tx} \quad (10)$$

In practical systems, N and $P_{Tx}$ can be known, and the parameter $\beta_n$ and $\alpha_n$ can be computed and optimised respectively. The $P_{CEU,n}$ is unknown and needs to be computed in order to configure the subcarrier power level for every CEU and CCU allocation. $P_{CEU,n}$ is computed as:

$$P_{CEU,n} = \frac{P_{Tx}}{(\beta_n N) + \alpha_n(1-\beta_n)N} \quad (11)$$

The configuration of numbers of subcarriers allocated for CEUs and CCUs in cell-n are expressed in (6) and (7), and their subcarrier power levels are shown in (11) and (8) respectively.

Step 2: Scheduling and Resource Allocation

Figure 13:
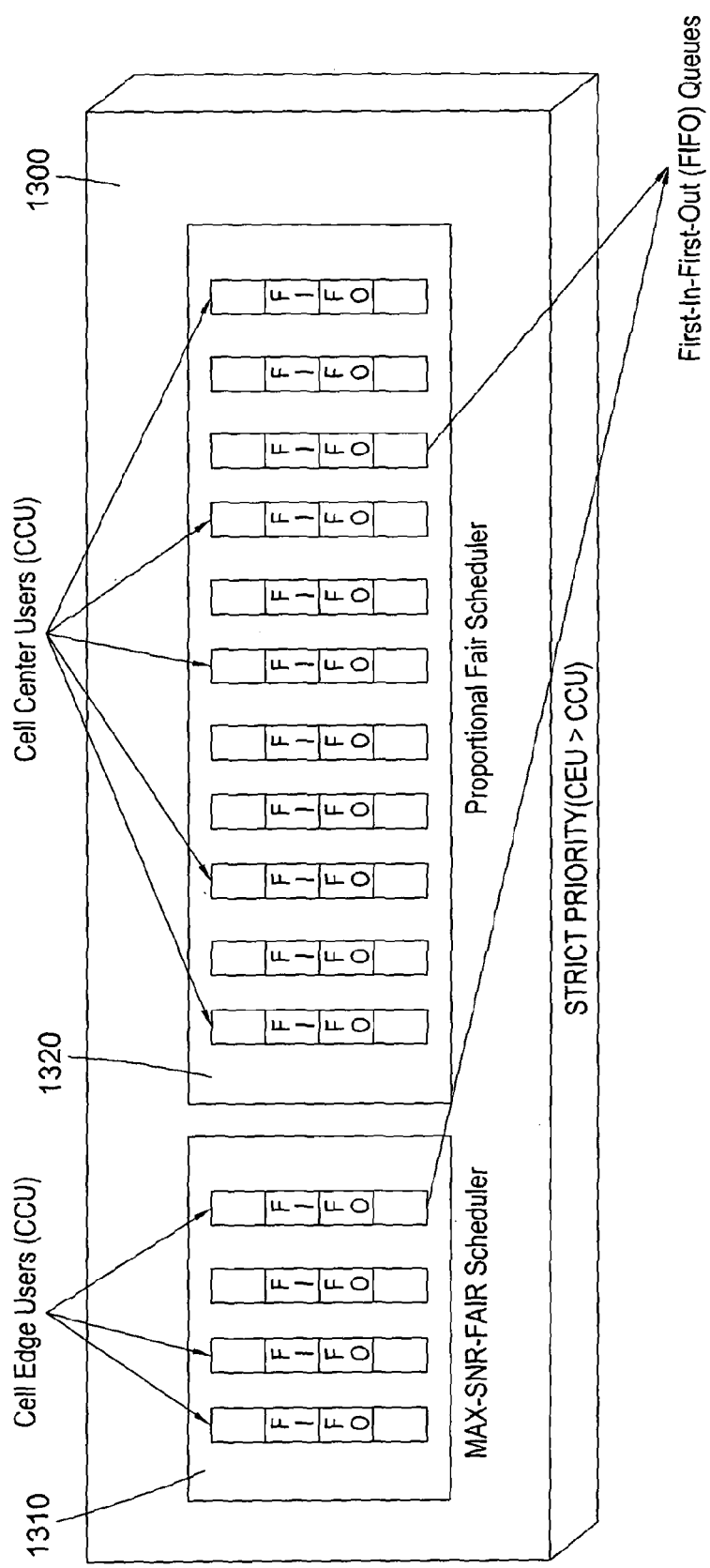
FIG. 13 shows a scheduler of an embodiment.

A two-tier scheduling architecture 1300, as illustrated in FIG. 13 is used in an embodiment. Two separated schedulers are applied to serve CCUs and CEUs, but the CEUs have the highest priority due to support the objective function of maximising the CEU throughput. So, the first-tier scheduling is effectively based on:

Strict Priority(CEU>CCU)

Subject to for every adjacent cell, the maximum number of allocated subcarriers of CEU $N_{ceu,n}$ is:

$$N_{ceu,n} = \left\lfloor \frac{N}{C_n} \right\rfloor \quad (12)$$

where $C_n$ is the number of adjacent cells, which includes the reference cell. This computation is to ensure that all cells have sufficient dedicated subcarriers for their CEUs, and also to avoid resource starvation for CCUs.

The second-tier scheduling involves scheduling among CEUs and also scheduling among CCUs that are served by their own schedulers. As shown in FIG. 13, the CEUs are served by a MAX-SNR-FAIR scheduler 1310 and the CCUs are served by a Proportional Fair Scheduler 1320.

Two coordinated resource allocation methods are proposed:

(1) Static and localised allocation, in Method (1) every adjacent cell is assigned with a group of consecutive subcarriers.

(2) Dynamic and distributed allocation. This embodiment considers the frequency diversity gain from the users' subcarriers qualities. Method (2) is to dynamically serve all CEU users across the adjacent cells in a centralised manner. This is possible with the presence of Cell Cluster Controller (CCC) within the cell.

For both methods, a utility is defined as an SINR or a ratio of achievable transmit rate over the past throughput. A scheduler based on SINR is referred as Max-SINR scheduler; otherwise it is referred as Proportional-Fair (PE) scheduler. A combination of PF and Max-SINR schedulers can also be used where PF is used at time-domain to find which user to be served, and Max-SINR is used at frequency domain to allocate the corresponding user onto its best subcarrier.

Figure 10:
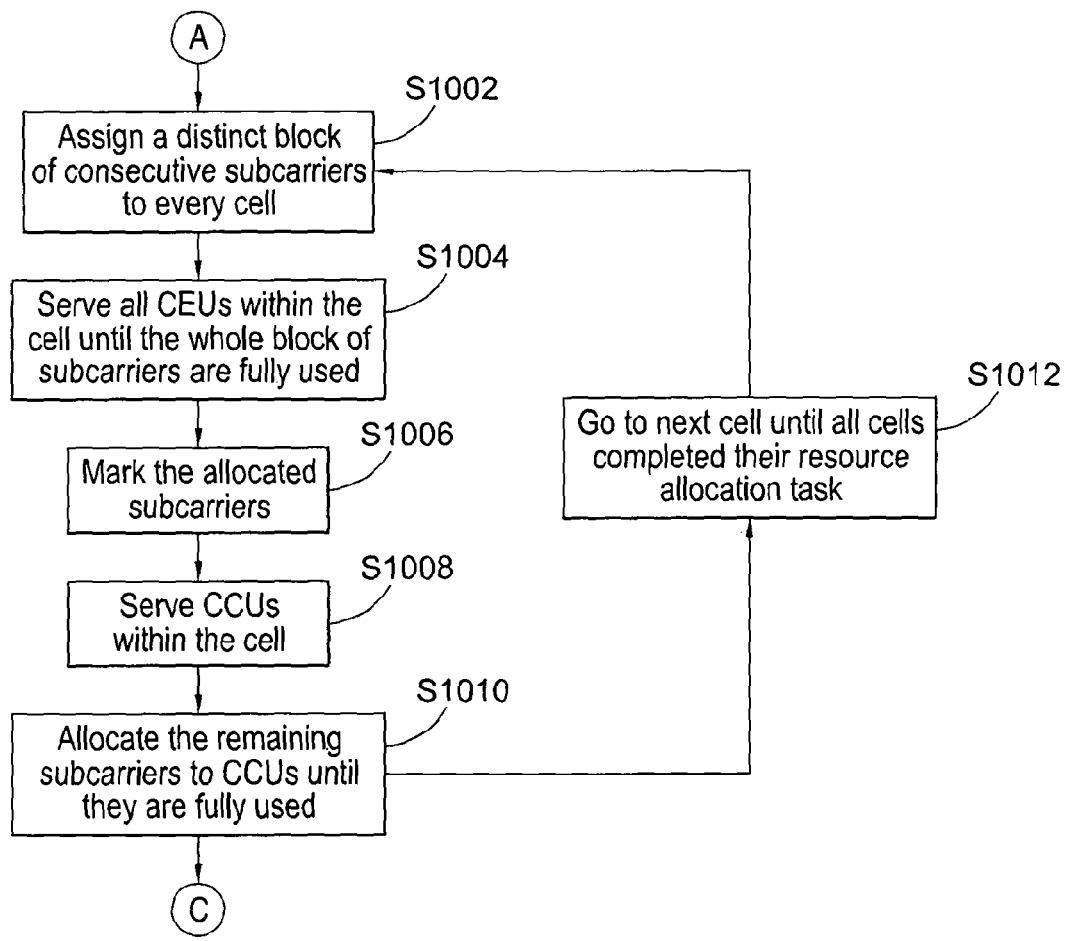

As summarised in FIG. 10, Method (1)—Static Resource Allocation is performed by every cell-n with the following steps:

In step S1002 a unique block of subcarriers $S_n$ and the subcarrier offset (or start index) l for the CEU allocation is assigned. The number of subcarriers $N_{ceu,n}$ in block $S_n$ is computed based on (6), and its maximum value can only reach as in (12).

Denote $c_{n,i,k}$ as the utility of $k^{th}$ subcarrier of CEU in cell-n. Find the user $x_{n,i,k}$ that has the highest $c_{n,i,k}$ within the cell. This is obtained by sorting the series of $c_{n,i,k}$ of all users in descending order formulated as:

$$x_{n,i,k} = \underset{l \leq k \leq l+N_{ceu,n}}{\operatorname{argmax}} (c_{n,i,k}) \qquad (13)$$

subject to the maximum number of subcarriers $n_{ceu,n}$ per user $\epsilon$ is:

$$n_{ceu,n} = \left\lfloor \frac{N_{ceu,n}}{U_{ceu,n}} \right\rfloor \qquad (14)$$

only if the scheduler used is based on Max-SINR. The constraint does not apply to PF scheduler due to its achievable fairness.

In step S1004 the respective user is served if and only if the chosen subcarrier is available and the number of subcarriers for user $x_{n,i,k}$ is below $n_{ceu,n}$. Or, else serve the next user from the sorted user's list.

In step S1006 the allocated subcarrier of $c_{n,i,k}$ is marked.

Steps S1004 and S1006 are repeated until the whole block of subcarriers is allocated.

In step S1008 to serve CCUs in cell-n, either a Proportional-Fair (PF) scheduler or maximum SINR scheduler is used.

The scheduling policy is applied to each subcarrier of a symbol within a frame. The allocated subcarriers for CCUs must be beyond the block of subcarriers $s_n$, and the maximum number of CEU subcarriers is as computed in (7).

Any remaining subcarriers are allocated to CCUs in step S1010.

In S1012 the method moves to the next cell until all cells have completed their resource allocation task.

The method shown in FIG. 10 may be implemented on a cell level, for example at a base station in the cell, or may be implemented on a cell cluster controller.

Figure 11:
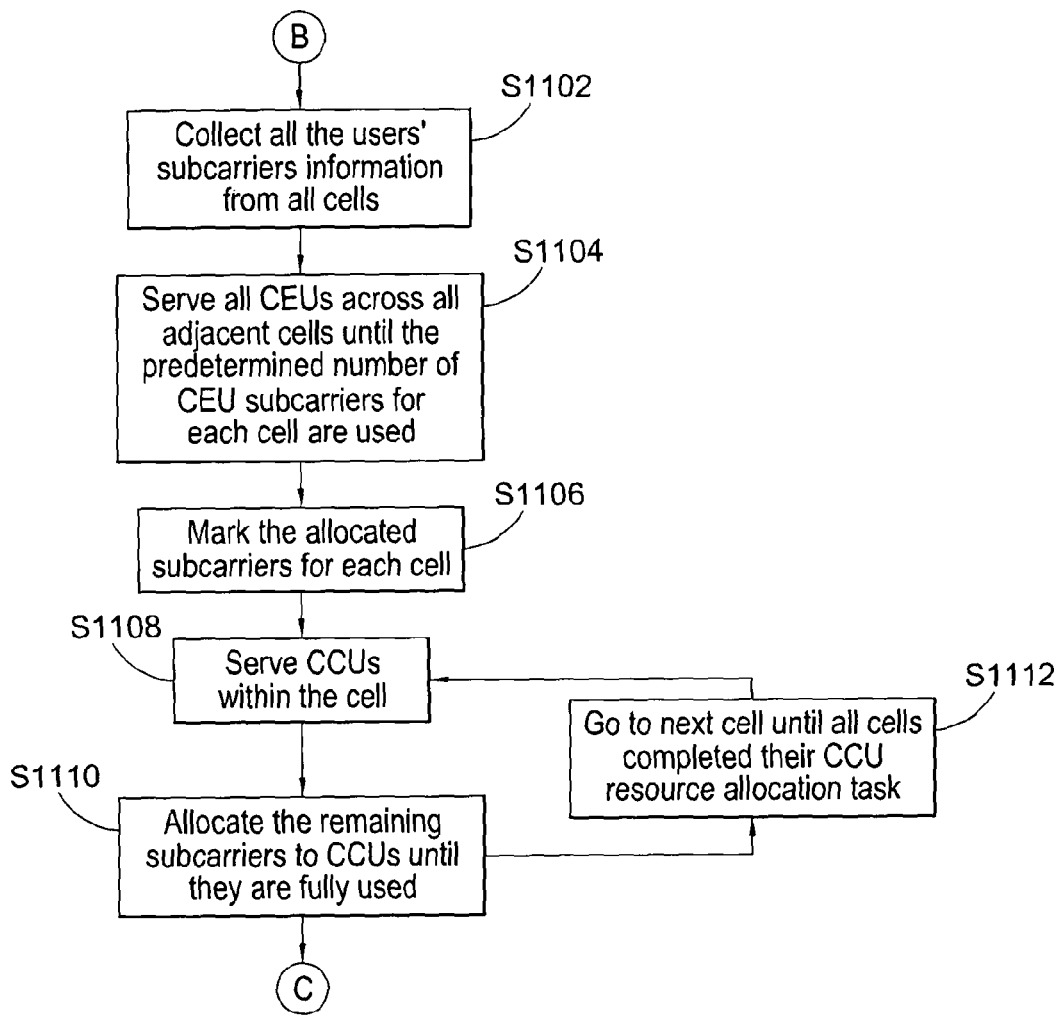

As summarised in FIG. 11, the procedure of Method (2) is based on all the users' subcarriers conditions across all the adjacent cells, which explained as:

In step S1102 all the user's subcarriers of utility $c_{n,i,k}$ (e.g. SINR) are collected from all the corresponding cells-n.

Find the user $x_{n,i,k}$ that has the highest utility of subcarrier by sorting the user's subcarriers information in descending order as shown in (13).

In step S1104 the respective user is served if and only if the chosen subcarrier is available and the number of subcarriers for user $x_{n,i,k}$ is below $n_{ceu,n}$. Or, else serve the next user from the sorted user's list.

In step S1106 the allocated subcarrier marked and the number of subcarriers of user $n_{n,i}$ is increased by one.

Steps S1104 and S1106 are repeated until the required number of subcarriers for CEU allocation for every cell is satisfied.

In step S1108 To serve CCU users in cell-n, S1008 in Method (1) is used in a cell basis. However, the CCUs are only assigned to the remaining available subcarriers. In S1210 remaining subcarriers are allocated to CCUs until the subcarriers are fully used. The allocation of subcarriers to CCUs is repeated for all cells in step S1112.

Step 3: QoS Requirement Validation

Figure 12:
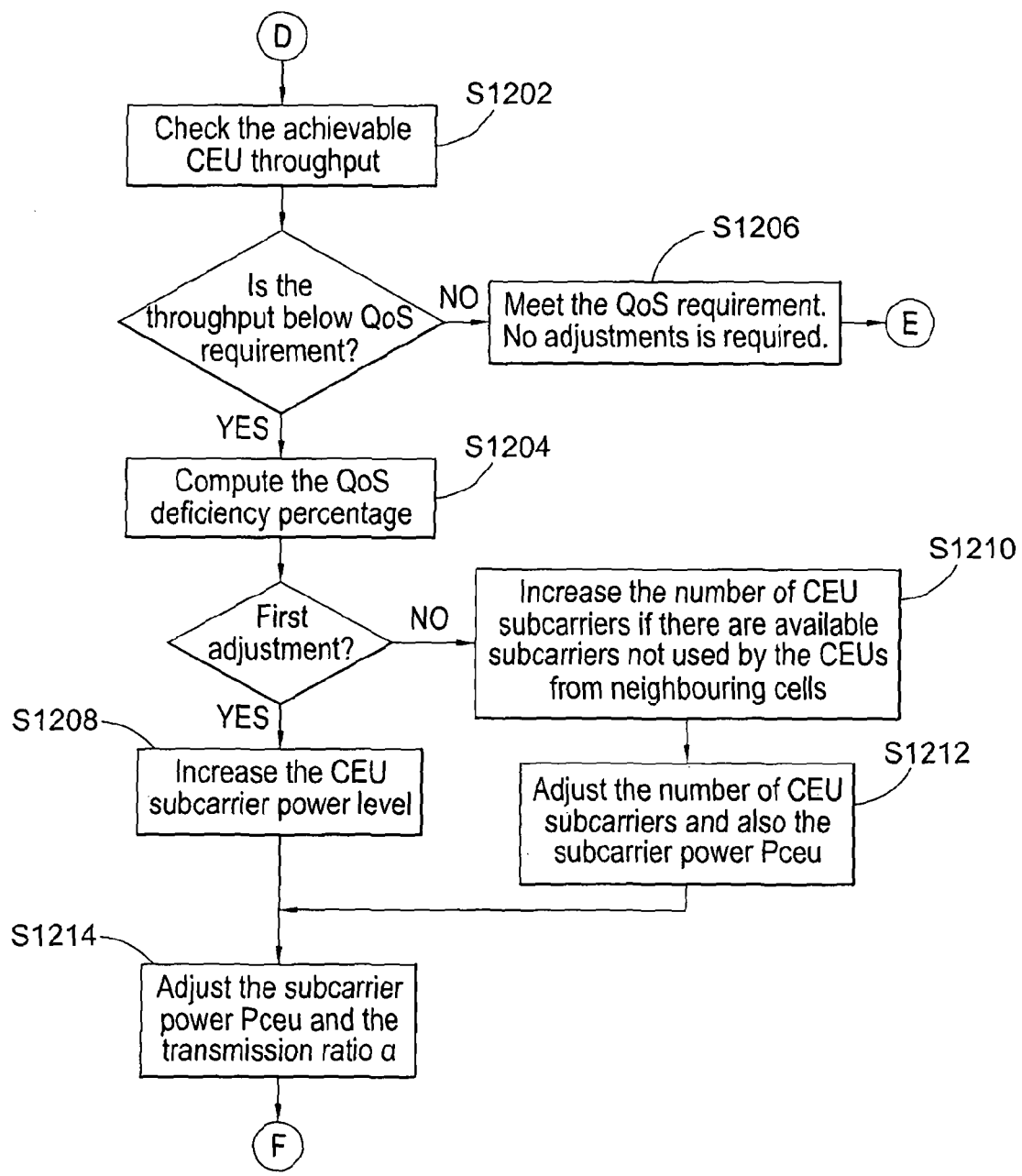

FIG. 12 shows the validation of the QoS requirement. This step is to validate the achievable throughput of CEU $H_{ceu,n}$ satisfying the required data rate R (i.e. QoS), which the later can either be identical or varied predefined values for the adjacent cells.

If the requirement is satisfied, the configuration in Step 2 remains, otherwise some adjustments of the subcarrier power level will be made. As summarised in FIG. 12, the details of the QoS validation are:

S1202: Check if the achievable throughput $H_{ceu,n}$ from the previous frame below the predefined data rate requirement $R_n$ (i.e. $H_n < R_n$).

If this is true, move to step S1204 and compute the QoS deficiency percentage do as:

$$d_n = \left[ \frac{R_n - H_{ceu,n}}{R_n} \right] \times 100\% \qquad (15)$$

Or, otherwise if the QoS requirement is met, the method moves to S1206 since no adjustment is required. Following S1206 Step 2: Scheduling and Resource Allocation is repeated for the next frame.

Step 4: Power or Subcarrier Adjustment

The parameter adjustment or tuning is typically referred to the level of the adjustment.

In S1207 it is determined if an adjustment has been made. If it is the first level, that is no adjustment has already been performed, the method moves to step S1208 and the subcarrier power tuning is performed where the new CEU subcarrier power $P_{new,CEU}$, and the transmission ratio $\alpha_{new,n}$ as in (16) and (17) respectively are applied in the system in step S1214.

$$P_{new,CEU} = (d_n \times P_{CEU}) + P_{CEU} \qquad (16)$$

$$\alpha_{new,n} = \frac{P_{Tx} - P_{CEU}(\beta_n N)}{P_{CEU}(1 - \beta_n)N} \qquad (17)$$

The subcarrier weight $\beta_n$ remains as the initial configuration, and the number of subcarriers N as well as the transmission power $P_{Tx}$ are usually fixed in the practical systems.

If the QoS requirement still cannot be satisfied with the first adjustment, the method moves to the second level of adjustment in step S1210. In step S1210, the second level adjustment is to increase the number of CEU subcarriers if and only if there are some subcarriers not being used by the CEUs of the neighbouring cells.

The adjustment is mainly made on the number of CEU subcarriers $N_{ceu,new,n}$ and subcarrier weight $\beta_{new,n}$ as computed in (18) and (19) respectively.

A new subcarrier power level for CEU is tuned in step S1212 as presented in (20); so that the total transmit power f can be remained. The other parameter values (i.e. $P_{CEU}$, $P_{Tx}$, N) are exactly the same as the initial configuration.

$$N_{ceu,new,n} = (d_n + 1) \times \beta_n N_{ceu,n} \qquad (18)$$

$$\beta_{new,n} = \frac{N_{ceu,new,n}}{N} \qquad (19)$$

$$P_{CEU,new,n} = \frac{P_{Tx}}{(\beta_{new,n} N) + \alpha_n(1 - \beta_{new,n})N} \qquad (20)$$

Next, Step 1 is repeated with this new configuration in order to satisfy the required QoS.

Figure 14:
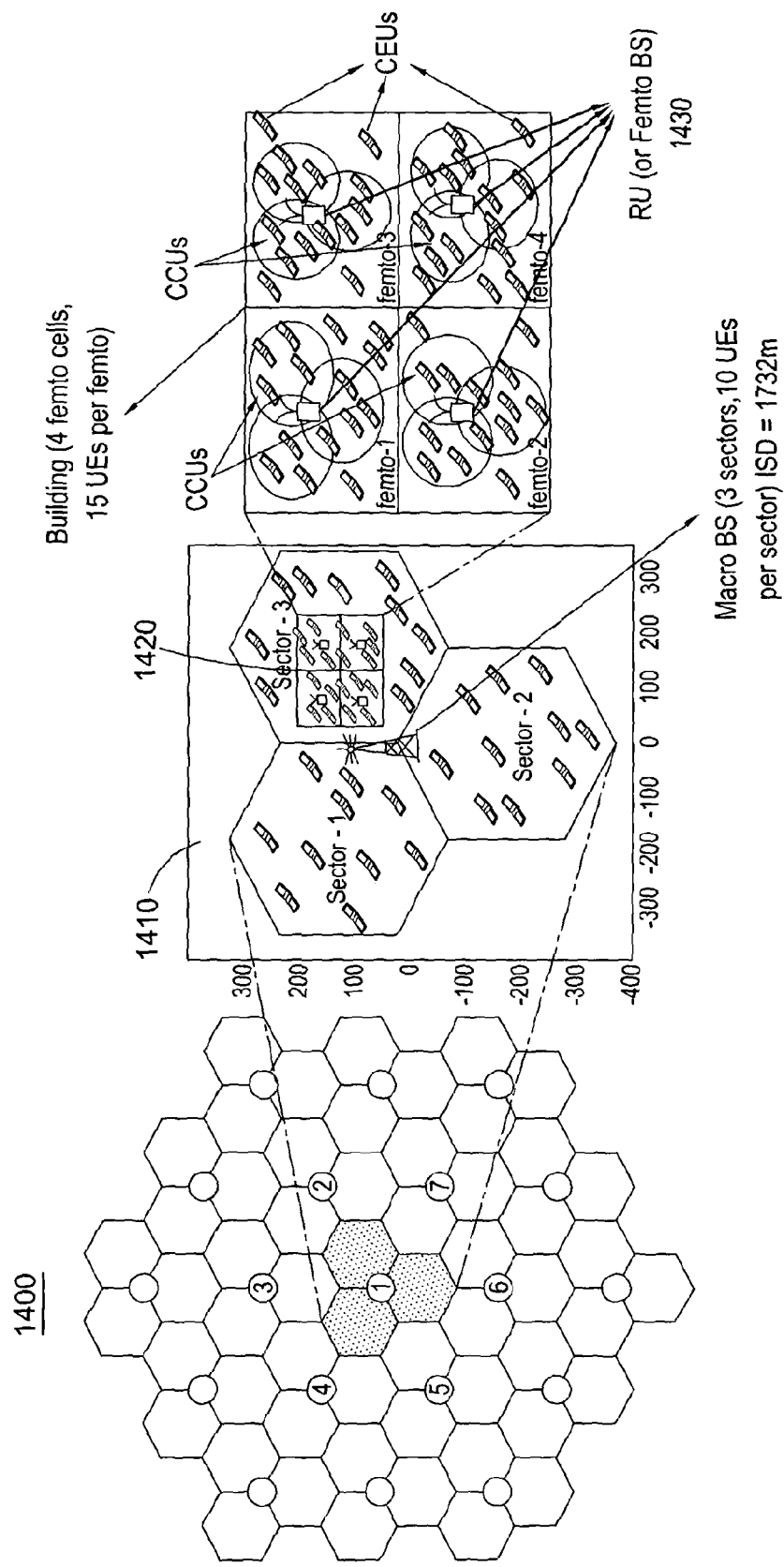
FIG. 14 shows a wireless network according to an embodiment.

FIG. 14 shows a network 1400 according to an embodiment. The network layout of the network 1400 is modelled with 19 macro cells as shown in FIG. 14. Each macro 1410 cell has 3 sectors, the inter site or macro BS distance (ISD)

is 1732 meters, and there are 4 small base stations 1430 within a building 1420 located in the macro cell 1410. Each small cell implements MIMO (multiple-input-multiple-output) system. The small base station 1430 has 2 transmit antennas, and serves 15 users with 2 MIMO-MRC (maximal ratio combining) receivers. The schedulers used in the proposed schemes (Block Adaptive SFR and Dynamic Adaptive SFR) are PF and Max-SINR to serve CCUs and CEUs respectively. The other schemes are assumed to employ only the PF scheduler.

Embodiments take into account the QoS requirement to enhance the CEU performance by adjusting the number of subcarriers and subcarrier power. Embodiments are dynamic and adaptive to the cell environments without deteriorating overall system performance. In embodiments it is not only the cell-edge performance that is improved, but also the aggregate cell throughput. The fairness among CCUs and CEUs is also considered during the scheduling task by introducing a threshold for the CEU resource allocation although it has the highest priority.

Embodiments provide scheduling and resource allocation method, which has reasonably low complexity when applied in practical applications. Embodiments can be applied in Long Term Evolution (LIE), Distributed System (DAS) and in the cloud networks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method of managing resources in a cell cluster of a wireless network, the cell cluster comprising a plurality of cells, each cell having an inner region and an outer region, the method comprising:
   setting, for each cell, a power ratio, the power ratio being the ratio of the power level to be used for transmission of signals to wireless devices located in the inner region of that cell to the power level to be used for transmission of signals to wireless devices located in the outer region of that cell;
   allocating network resources from a plurality of network resources to wireless devices located in the outer regions;
   for each cell, allocating network resources to wireless devices located in the inner region of that cell from network resources of the plurality of network resources that are not allocated to wireless devices located in the outer region of that cell;
   receiving, for each cell, indications of a first data throughput rate for transmission of data to the wireless devices located in the outer regions;
   comparing, for each cell, the first data throughput rate with a threshold data rate;
   decreasing the power ratio for cells in which the first data throughput rate is less than the threshold data rate;
   receiving, for each cell in which the first data throughput rate is less than the threshold data rate, indications of a second data throughput rate for transmission of data to the wireless devices located in the outer regions;
   comparing, for each cell in which the first data throughput rate is less than the threshold data rate, the second data throughput rate with the threshold data rate;
   determining for cells in which the second data throughput rate is below the threshold whether a resource exists that is not allocated to a wireless device located in an outer region of any neighbouring cell; and
   if a resource exists that is not allocated to a wireless device located in an outer region of any neighbouring cell, increasing the number of resources allocated to a wireless device located in the outer region.

2. The method of claim 1, wherein allocating network resources from a plurality of network resources to wireless devices located in the outer regions comprises allocating network resources among the wireless devices located in the outer regions of the plurality of cells.

3. The method of claim 2, wherein allocating network resources from a plurality of network resources to wireless devices located in the outer regions comprises comparing channel characteristics for wireless devices in different cells and making an allocation based on the result of the comparison.

4. The method of claim 1 wherein allocating network resources from a plurality of network resources to wireless devices located in the outer regions comprises for each cell, allocating resources to wireless devices from a set of resources allocated to that cell.

5. The method of claim 1, further comprising calculating a measure of the difference between the first data throughput rate and the threshold data rate, and decreasing the power ratio by an amount depending on the measure of the difference.

6. The method of claim 1, wherein the number of network resources from the plurality of network resources allocated to wireless devices located in the outer region of a cell is determined from the number of wireless devices located in the outer region of that cell.

7. A non-transitory computer readable carrier medium carrying processor executable instructions which when executed on a processor cause the processor to carry out a method according to claim 1.

8. A method of managing resources in a cell of a wireless network, the cell having an inner region and an outer region, the method comprising:
   setting an initial power ratio for the ratio of the power used to transmit signals from the base station to wireless devices located in the inner region to the power used to transmit signals from a base station within the cell to wireless devices located in the outer region;
   allocating network resources to wireless devices located in the outer region;
   allocating network resources to wireless devices located in the inner region;
   transmitting data to the wireless devices;
   measuring a first data throughput rate for transmission of data to the wireless devices located in the outer region;
   comparing the first data throughput rate with a threshold data rate;
   if the first data throughput rate is less than the threshold data rate, decreasing the power level ratio;
   transmitting data to the wireless devices at the decreased power level ratio;
   determining a second data throughput rate
   comparing the second data throughput rate with the threshold data rate;

determining whether a resource exists that is not allocated to a wireless device located in an outer region of any neighbouring cell; and if a resource exists that is not allocated to a wireless device located in an outer region of any neighbouring cell, increasing the number of resources allocated to a wireless device located in the outer region.

9. The method of claim 8, further comprising calculating a measure of the difference between the first data throughput rate and the threshold data rate, and decreasing the power ratio by an amount depending on the measure of the difference.

10. The method of claim 8, wherein the number of network resources from the plurality of network resources allocated to wireless devices located in the outer region of the cell is determined from the number of wireless devices located in the outer region of that cell.

11. A non-transitory computer readable carrier medium carrying processor executable instructions which when executed on a processor cause the processor to carry out a method according to claim 8.

12. A network controller, comprising
a wireless communications device configured to send and receive signals from a plurality of base stations of a wireless network, the wireless network comprising a plurality of cells, each cell having an inner region and an outer region, base stations of the plurality of base stations being located in the inner regions of the cells; and a processor operable to:
set, for each cell, a power ratio, the power ratio being the ratio of the power level to be used for transmission of signals to wireless devices located in the inner region of that cell to the power level to be used for transmission of signals to wireless devices located in the outer region of that cell;
allocate network resources from a plurality of network resources to wireless devices located in the outer regions;
for each cell, allocate network resources to wireless devices located in the inner region of that cell from network resources of the plurality of network resources that are not allocated to wireless devices located in the outer region of that cell;
compare, for each cell, a first data throughput rate for transmission of data to the wireless devices located in the outer regions with a threshold data rate;
decrease the power ratio for cells in which the first data throughput rate is less than the threshold data rate;
compare, for each cell in which the first data throughput rate is less than the threshold data rate, a second data throughput rate for transmission of data to the wireless devices located in the outer regions with the threshold data rate;
determine for cells in which the second data throughput rate is below the threshold whether a resource exists that is not allocated to a wireless device located in an outer region of any neighbouring cell; and
if a resource exists that is not allocated to a wireless device located in an outer region of any neighbouring cell, increase the number of resources allocated to a wireless device located in the outer region.

13. The network controller of claim 12, wherein the processor is operable to compare channel characteristics for wireless devices in different cells and make an allocation of wireless network resources based on the result of the comparison.

14. The network controller of claim 12, wherein the processor is operable to calculate a measure of the difference between the first data throughput rate and the threshold data rate, and decrease the power ratio by an amount depending on the measure of the difference.

15. A base station comprising:
an antenna operable to transmit and receive signals from wireless devices in a cell of a wireless network, the cell having an inner region and an outer region; and
a processor operable to:
set an initial power ratio for the ratio of the power used to transmit signals from the base station to wireless devices located in the inner region to the power used to transmit signals from a base station within the cell to wireless devices located in the outer region;
allocate network resources to wireless devices located in the outer region;
allocate network resources to wireless devices located in the inner region;
determine a first data throughput rate for transmission of data to the wireless devices located in the outer region;
compare the first data throughput rate with a threshold data rate;
if the first data throughput rate is less than the threshold data rate, decrease the power level ratio;
determine a second data throughput rate;
compare the second data throughput rate with the threshold data rate;
if the second data throughput rate is less than the threshold data rate, determine whether a resource exists that is not allocated to a wireless device located in an outer region of any neighbouring cell; and
if a resource exists that is not allocated to a wireless device located in an outer region of any neighbouring cell, increase the number of resources allocated to a wireless device located in the outer region.

16. The base station of claim 15, wherein the processor is further operable to,
calculate a measure of the difference between the first data throughput rate and the threshold data rate, and decrease the power ratio by an amount depending on the measure of the difference.

* * * * *